(No Model.)
J. McNAUGHTON.
WHEEL RUNNER.
No. 596,414.
Patented Dec. 28, 1897.
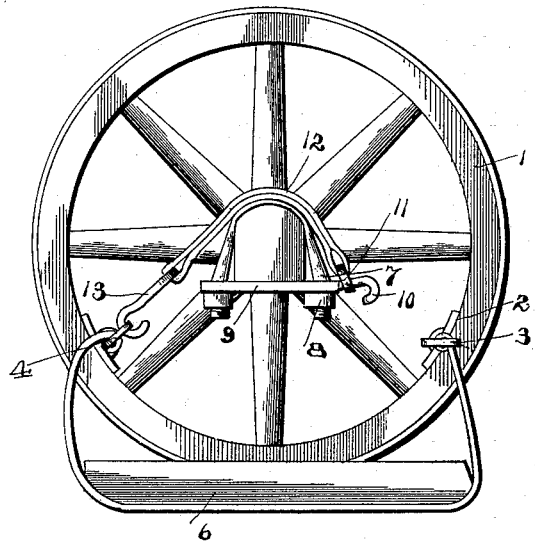
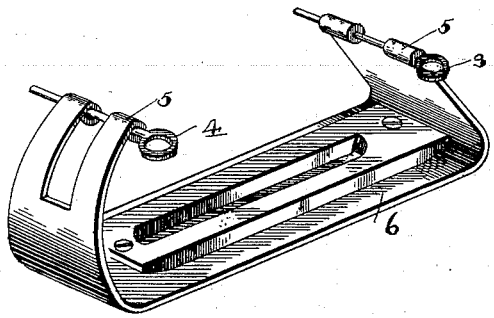
Witnesses
W. J. Van Loan
Victor J. Evans
Inventor
John McNaughton.
By John Wedderburn
Attorney

UNITED STATES PATENT OFFICE.

JOHN McNAUGHTON, OF RUBY HILL, NEVADA.

WHEEL-RUNNER.

SPECIFICATION forming part of Letters Patent No. 596,414, dated December 28, 1897.

Application filed July 29, 1897. Serial No. 646,396. (No model.)

*To all whom it may concern:*

Be it known that I, JOHN MCNAUGHTON, of Ruby Hill, in the county of Eureka and State of Nevada, have invented certain new and useful Improvements in Wheel-Runners; and I do hereby declare the following to be a full, clear, and exact description of the invention, such as will enable others skilled in the art to which it appertains to make and use the same.

My invention relates to new and useful improvements in wheel-runners; and it consists of the combination and arrangement of simple parts that will be hereinafter set forth.

The object of the invention is to produce a device of the character above mentioned that will be especially simple in construction, economical, and efficient in operation.

A further object of the invention is to provide a wheel-runner and means for securing the same to the wheel, whereby the same can be readily attached to the wheel and detached therefrom when not desired for use.

Other objects and advantages of the invention will become apparent in the course of the following description, and the points of novelty will be particularly set forth in the claims.

I am enabled to accomplish the object of my invention by the simple means illustrated in the accompanying drawings, in which—

Figure 1 represents a side view of a wheel with my improved runner and means for attaching same applied thereto. Fig. 2 is a perspective view of the runner detached.

Referring to the drawings, the numeral 1 indicates an ordinary wagon-wheel, which is provided upon the inner periphery of the rim thereof with lugs or projections 2, which are secured to the wheel in any convenient manner. Said lugs are provided with perforations which are adapted to receive pins 3 and 4, which pass through eyes 5 in the bifurcated ends of a runner 6, thus securing said runner to the wheel.

The numeral 7 indicates a clip or yoke which is secured to the axle of the vehicle preferably by nuts 8, which are adapted to be secured on the threaded arms of the said yoke 7. The said arms extend through a plate 9, which is provided with a hook 10 on the rear end thereof for the reception of a ring 11, which is secured to one end of a strap 12, which passes over the top of the yoke and is provided at its forward end with a hook 13, which is adapted to be secured in the eye provided in the end of the pin.

The runner is preferably provided on the floor thereof with a groove or recess into which a portion of the periphery of the wheel extends to prevent the runner from sliding laterally.

It will be observed that the device herein described is especially simple and that it can be readily attached to and detached from the vehicle-wheel and that the same can be manufactured at a very low figure; also, that the wheel will be effectually locked with relation to the runner and that by reason of the construction of the parts the strain upon the axle is reduced to a minimum, thus improving devices of this character to a great extent.

Having thus described my invention, what I claim as new, and desire to secure by Letters Patent, is—

1. In a device of the character described the combination with a vehicle-wheel provided with perforated lugs or projections on the inner periphery of the rim thereof, a runner formed with the bifurcated ends adapted to embrace the rim of the wheel and provided at its upper ends with eyes or their equivalents, of pins passing through said eyes and through the perforations in the lugs or projections on the inner periphery of the wheel-rim, a strap or its equivalent passing over the yoke or clip on the axle of the vehicle, secured at one end to said clip, and at the other to the forward pin, substantially as and for the purpose set forth.

2. In a device of the character described, the combination of the wheel provided with lugs or projections on the inner periphery of the rim thereof, a runner provided with a longitudinal groove or recess, adapted to receive a portion of the periphery of the wheel, said runner being formed with bifurcated ends adapted to straddle or embrace the wheel-rim, pins provided with eyes, and passing through the eyes in the bifurcated ends of the runner and through the perforations in the lugs or projections whereby the same is secured to the wheel, a yoke secured upon the axle of the vehicle, a strap secured to one side of said yoke and passing over the same, and provided with a hook at its other end adapted to enter the eye in the pin passing through the forward end of the runner, substantially as and for the purpose set forth.

In testimony whereof I have signed this specification in the presence of two subscribing witnesses.

JOHN McNAUGHTON.

Witnesses:
T. A. BURDICK,
JOHN FINE.